(No Model.) 2 Sheets—Sheet 1.

H. BRIGGS.
VELOCIPEDE.

No. 448,204. Patented Mar. 17, 1891.

Witnesses
A. Bechtel
James Stuart

Inventor
Henry Briggs
By his Attorney
C. Henry Toney (No Model.) 2 Sheets—Sheet 2.
H. BRIGGS.
VELOCIPEDE.
No. 448,204. Patented Mar. 17, 1891.
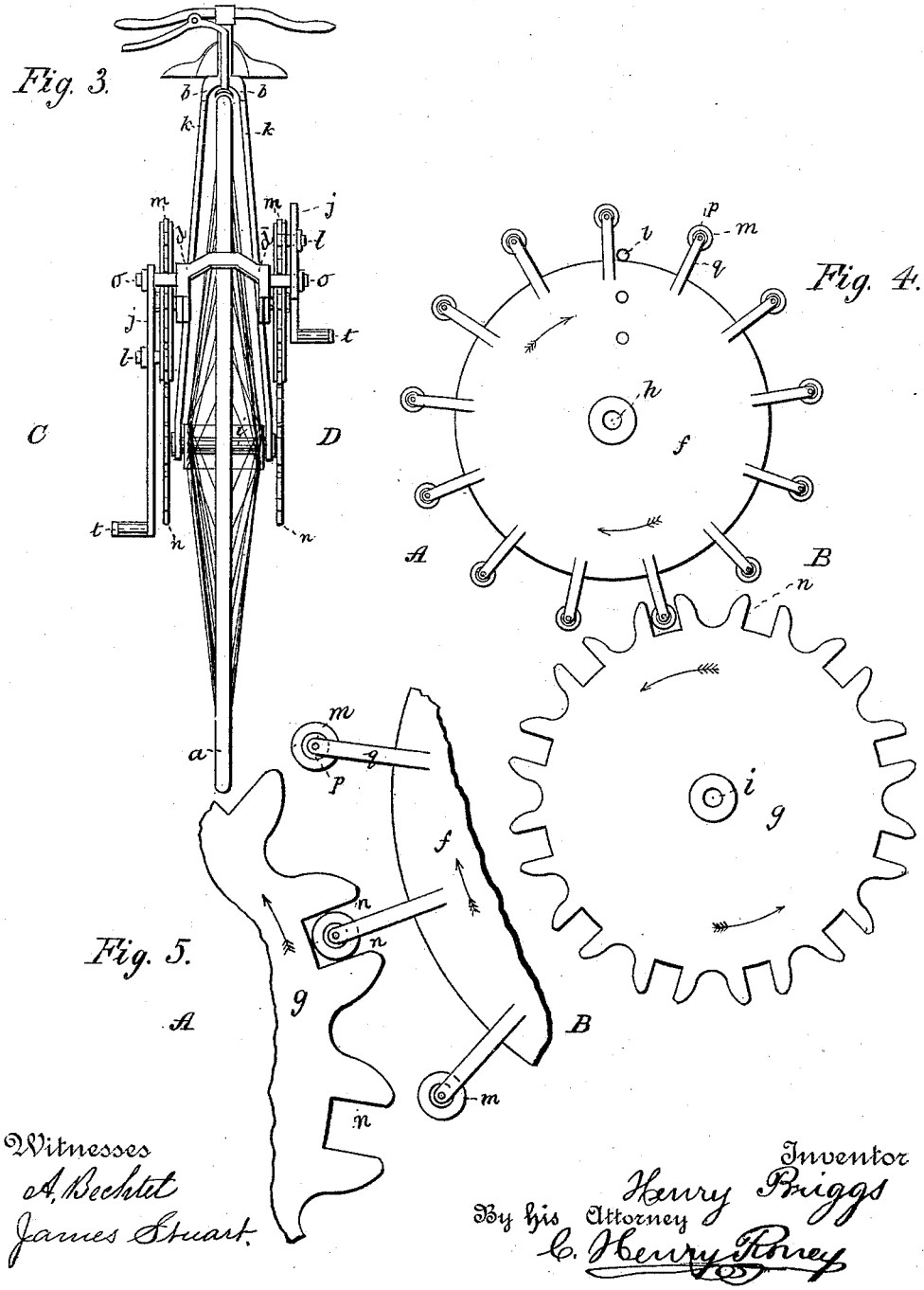
Witnesses
A. Bechtel
James Stuart
Inventor
Henry Briggs
By his Attorney
C. Henry Roney

UNITED STATES PATENT OFFICE.

HENRY BRIGGS, OF PHILADELPHIA, PENNSYLVANIA.

VELOCIPEDE.

SPECIFICATION forming part of Letters Patent No. 448,204, dated March 17, 1891.

Application filed June 13, 1890. Serial No. 355,318. (No model.)

*To all whom it may concern:*

Be it known that I, HENRY BRIGGS, a citizen of the United States of America, and a resident of the city and county of Philadelphia, in the State of Pennsylvania, have invented new and useful Improvements in Velocipedes, of which the following is a specification.

My invention relates to that class of velocipedes known as "bicycles;" and it consists of an improvement in mechanism for revolving the wheel and propelling the bicycle. I attain these objects by the mechanism shown in the accompanying drawings, in which—

Figure 1:
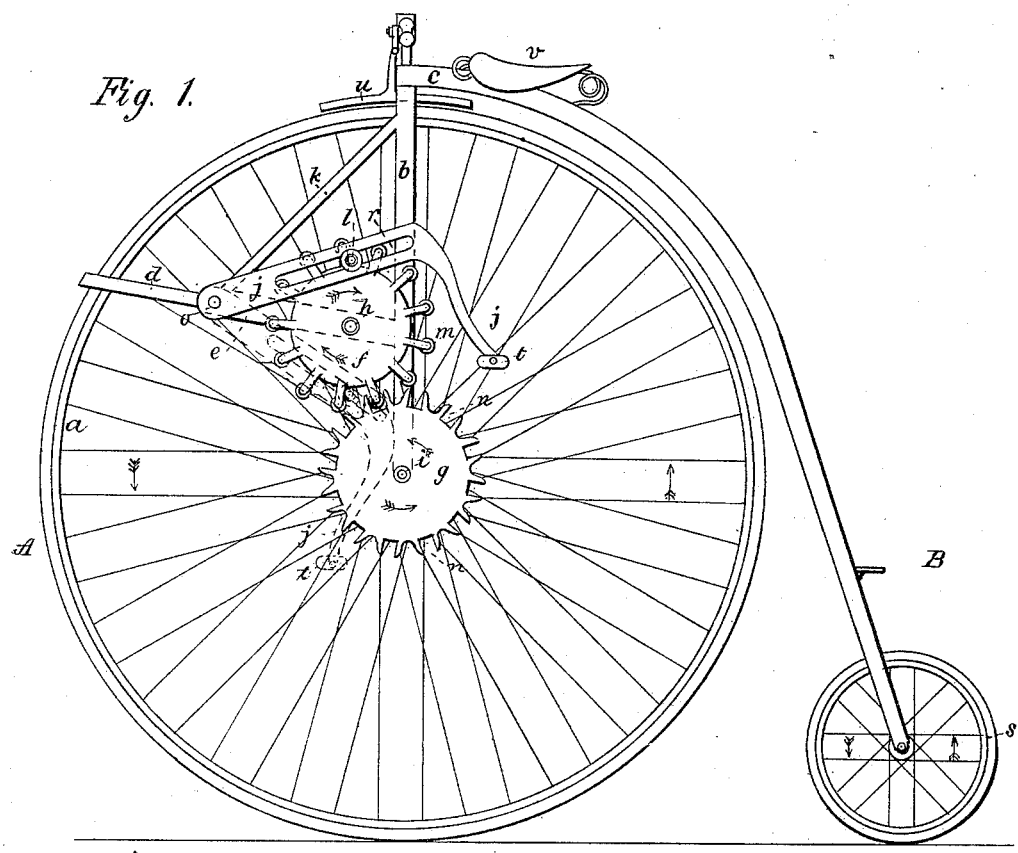
Figure 7:
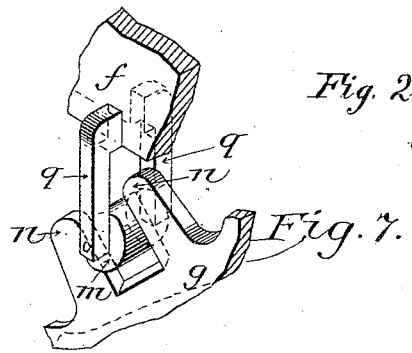
Figure 2:
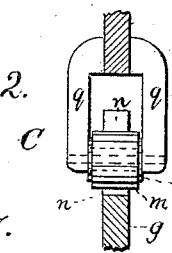
Figure 6:
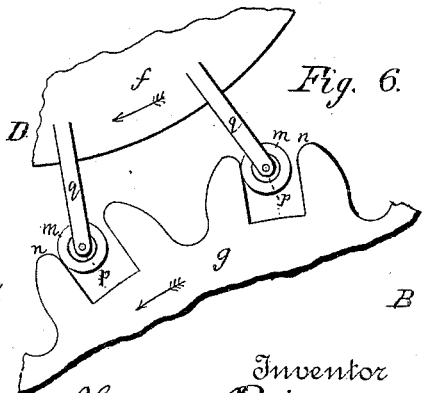

Figure 1 is a vertical longitudinal elevation A B of the left side of my machine. Fig. 2 is an enlarged view of a forked or slotted tooth of my gear or crank-wheel with its elastic friction-roller $m$ engaged with a tooth of my pinion. Fig. 3 is a vertical transverse elevation C D of the front of my machine, looking from A toward B of Fig. 1. Fig. 4 is an elevation A B of my gear or crank wheel and pinion on the left side of my machine with one tooth of my crank-wheel and one tooth or "leaf" of my pinion fully "engaged." Fig. 5 is an enlarged view of portion of Fig. 4. Fig. 6 is an enlarged view of one tooth of my crank-wheel disengaging the corresponding leaf of the pinion of my improved machine and its following tooth intercepting or "engaging" the following leaf of my pinion. Fig. 7 is an enlarged isometrical view of one of my forked or slotted teeth of my gear or crank wheel engaged with the corresponding leaf of the pinion of my machine.

Similar letters refer to similar parts in all the views.

My invention consists of a velocipede or bicycle having the axle $i$ of its driving-wheel $a$ provided with a pinion $g$ at each end of said axle $i$, the said pinion $g$ gearing into a gear or crank wheel $f$, this gear-wheel $f$ having on its face a crank-pin $l$, working in a slot or guides $r$ of a treadle crank-lever $j$, which treadle crank-lever $j$ is pivoted at one end $o$ on a frame-work $d$, attached to the frame or fork $b$ of the bicycle. The gear or crank wheel $f$ is also pivoted at $h$ to the frame-work $d$. These pinions $g\ g$, gear-wheels $f\ f$, and treadle crank-levers $l\ l$ are geared together so that when the treadle crank-lever and crank-pin on one side of the machine are at their highest points, as in the solid lines in Fig. 1 and at D in Fig. 2, the treadle crank-lever and crank-pin on the other side of the machine will be at their lowest points, as shown in dotted lines in the same Fig. 1 and at C in Fig. 2.

The arrows show the direction in which the wheels are revolved to drive the bicycle or machine ahead.

My invention is operated in the following manner by the rider sitting on the saddle $u$, the parts of the machine being in the position shown in Figs. 1 and 3, the treadle crank-lever $j$ on the left side D of the machine is depressed by the rider pressing down the treadle $t$ with his left foot, causing the crank-pin $l$ and wheel $f$ to revolve in the direction shown by the arrows, causing the pinion $g$ on the left side D of the machine to revolve, revolving the axle $i$ and wheel $a$ forward, which also causes the pinion on the other end C of the axle $i$ (or right-hand side of the machine) to revolve, revolving the crank or gear wheel $f$ and crank-pin $l$, (also on the right-hand side C of the machine,) raising the treadle crank-lever $l$ on side C, causing the wheel $a$ to revolve forward at the same time. The treadle crank-lever $l$ on the left-hand side D is now at its lowest point, and the treadle crank-lever $l$ on the right-hand side C at its highest point, so that when its treadle $t$ is pressed down by the right foot of the rider it causes the gear or crank wheel $f$, pinion $g$, axle $i$, and wheel $a$ to revolve and the treadle crank-lever $l$ on the left-hand side D to rise to its highest point ready to be depressed again, as at first described, so that by alternately depressing the highest treadle the machine will be driven ahead. By depressing the treadle crank-lever which is rising before it reaches its highest point the direction in which the gear-wheel is revolving will be reversed from that described, also reversing the pinion $g$ and wheel $a$, so that the machine will run backward.

The pinion $g$ and gear-wheel $f$ may be of any suitable size and number of teeth or "leaves" required; but I prefer that the leaves and teeth shall be so proportioned that but one tooth $q$ and one leaf $n$ shall be fully engaged and in full action at one time, and that as one tooth $q$ is engaging or entering a leaf $n$ the preceding slotted or forked tooth of the gear-wheel $f$ shall be leaving the preceding leaf of the pinion $g$. I make the teeth $q$ of my gear-wheel $f$ forked or slotted, as shown in the drawings at $q\ q$, so that the long leaf $n$ of my pinion $g$ shall move freely on the friction-roller $m$ of my gear or crank wheel $f$.

In order to reduce the friction, noise, and rattle of the gearing, I make the slotted or forked teeth $q$ of my gear or crank wheels $f$ with friction-rollers $m$, preferably of rubber, leatheroid, or other tough elastic material.

The frame-work $d$ may be stiffened and strengthened by carrying it in front of the wheel $a$ from one side C to the other side D, and may be further stiffened and strengthened, if desired, by the braces $k\ k$, connecting the frame-work $d$ with the frame or "fork" $b\ b$ of the machine.

Having thus described my invention, what I claim, and desire to secure by Letters Patent, is—

1. The gear or crank wheel having slotted or forked teeth carrying friction-rollers composed of or covered with rubber, leatheroid, or other elastic material, as shown and described, and for the purposes set forth.

2. In a velocipede or bicycle, the combination, with the wheel $a$, rear wheel $s$, frame or fork, backbone, and axle, of the pinions on the said axle, gear or crank wheel having forked or slotted teeth having friction-rollers, and crank-pin, guides, treadle-lever crank, and frame-work, as shown and described, and for the purposes set forth.

In testimony that I claim the foregoing as my invention I have signed my name, in presence of two witnesses, this 7th day of June, 1890.

HENRY BRIGGS. [L. S.]

Witnesses:
  C. HENRY RONEY,
  E. H. BAILEY.